G. P. ARTHUR, DEC'D.
E. C. ARTHUR, EXECUTRIX.
COTTON CHOPPER.
APPLICATION FILED JAN. 23, 1914.
1,113,940.
Patented Oct. 20, 1914.
2 SHEETS—SHEET 1.
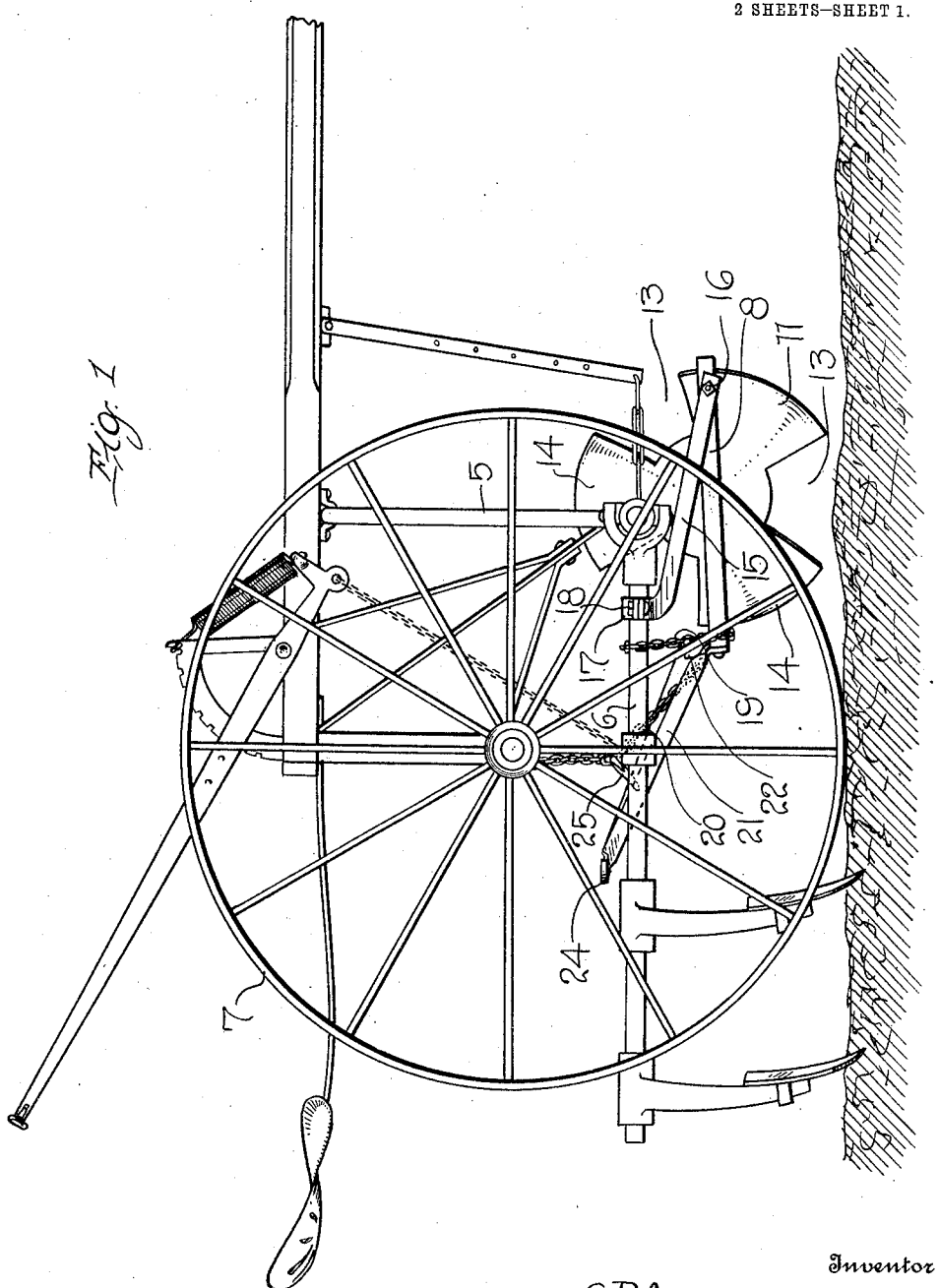
Inventor
G. P. ARTHUR   Deceased
BY  E. C. ARTHUR   Executrix
Witnesses
Robert M. Sutphen
A. L. Hurd.
By Watson E. Coleman
Attorney

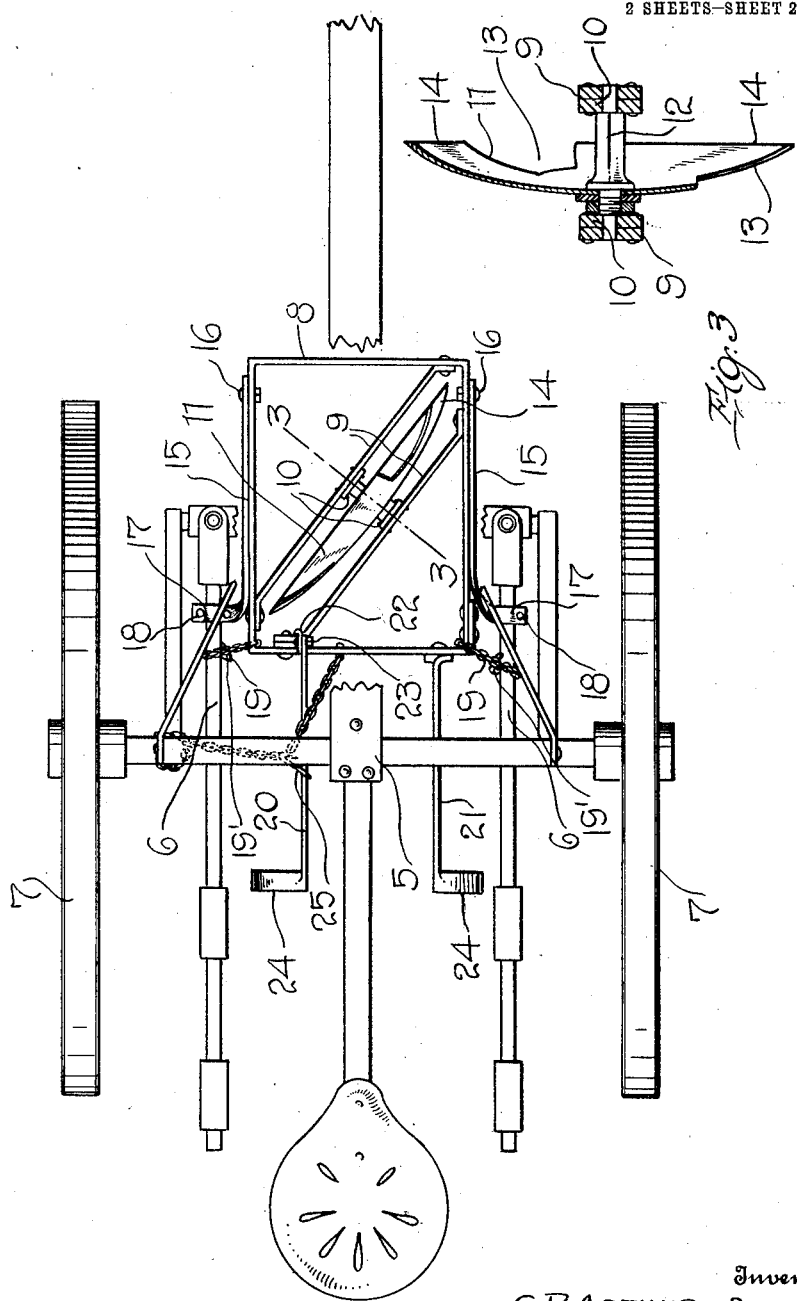

UNITED STATES PATENT OFFICE.

GEORGE P. ARTHUR, DECEASED, LATE OF MIDLAND, TEXAS, BY EUGENIA C. ARTHUR, EXECUTRIX, OF MIDLAND, TEXAS.

COTTON-CHOPPER.

1,113,940.     Specification of Letters Patent.     Patented Oct. 20, 1914.

Application filed January 23, 1914. Serial No. 813,982.

*To all whom it may concern:*

Be it known that GEORGE P. ARTHUR, deceased, late a citizen of the United States and a resident of Midland, in the county of Midland and State of Texas, did invent new and useful Improvements in Cotton-Choppers, of which the following is a specification, reference being had to the accompanying drawing.

This invention relates to cotton choppers and more particularly to a cotton chopping attachment for wheeled cultivators, the invention having for its primary object to provide a device of this character which may be easily and quickly attached to or detached from the cultivator frame to properly cut or chop out portions of the cotton row so that the growth of the remaining cotton is facilitated.

The invention has for another object to provide a cotton chopping attachment for cultivators embodying a rectangular frame, a disk mounted in said frame and having its axis obliquely disposed, said disk having a plurality of notches therein to form chopping blades, and means for mounting the frame upon the cultivator frame.

The invention has for a further object to provide a very simple, durable and efficient cultivator attachment of the above character and means for easily and quickly adjusting the same to dispose the cultivator disk at a desired height above the ground.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing, in which—

Figure 1 is a side elevation of a cultivator having my improved cotton chopper attachment applied thereto; Fig. 2 is a top plan view, portions of the cultivator being omitted; Fig. 3 is a section taken on the line 3—3 of Fig. 2.

Referring in detail to the drawing, 5 designates a cultivator frame which includes parallel rectangular bars 6. This cultivator frame is mounted upon suitable supporting wheels indicated at 7. It is to be understood that my improved cotton chopping attachment which forms the subject matter of this aplication, is not limited in its use to any particular form of cultivator, but, by resorting to minor mechanical changes, may be readily applied to any of the various types of such machines now in common use.

Referring more particularly to Figs. 2 and 3 of the drawings, it will be observed that the attachment includes a rectangular frame 8, in which the obliquely disposed parallel bars 9 are mounted and secured. To these bars intermediate of their ends, suitable bearing members 10 are fixed. 11 indicates the chopping disk which is concavo-convex in form and is provided with an axle 12, the ends of which are cylindrical and journaled in the bearings 10. This disk is provided in its periphery with a series of notches or recesses 13 whereby chopping blades 14 are formed.

The frame 8 is detachably mounted upon the cultivator frame 5 by means of the bars 15 which are pivotally connected at one of their ends as shown at 16 to the forward ends of the longitudinal bars of the frame 8. The other ends of the bars 15 are laterally extended and adapted for engagement with the longitudinal frame bars. Over the bars, the cap plates 17 are adapted to be arranged and secured to the ends of the bars 15 by means of the bolts 18. To the rear end of the chopper frame 8 at each side and the center thereof, a chain 19 is attached. The side chains are adapted to be wound upon the longitudinal bars 6 of the cultivator frame and the central chain upon the wheel axle. These chains are provided with hooks 19' upon their ends for engagement with one of the links of the respective chains. It will be obvious that by means of these chains, the rear end of the frame may be raised or lowered and the chopping disk thus positioned at a desired height above the ground.

To the rear transverse bar of the frame 8, the rearwardly extending bars 20 and 21 are connected. The bar 20 is attached to the cultivator frame through the medium of the plate 22 to which said bar is pivotally connected as at 23. The ends of these bars are laterally extended to provide foot rests 24 for engagement by the feet of the operator. To the bar 20, a rod 25 is connected, said rod being provided on its end with a hook for engagement with one of the links of the central supporting chain 19. The pressure upon the bars 20 and 21 by the operator's feet prevent upward movement of the rear end of the frame 8 in which the chopping disk is mounted.

From the foregoing, it is believed that the construction, manner of use and several advantages of my invention will be clearly and fully understood. As the cultivator moves over the plant row, the chopping disk 11 by engagement with the plants is rotated in the frame 8 and the cotton is caught in the notches or recesses 13 so that the edges of the blades 14 cut the same out of the plant row. Owing to the angular disposition of the disk in the frame 8, this portion of the cotton which is cut out from the row is discharged to one side of the row. The cultivator shovels which are located rearwardly of the chopping disk and travel upon opposite sides of the cotton row loosen or break up the earth at the base of the plant stalks in the usual manner. Thus it will be seen that by means of my attachment, the ordinary cultivator may be converted into a combined cultivator and cotton chopper thus eliminating the necessity of using two separate and distinct machines. The invention may also be very easily and quickly attached to or removed from the frame of the cultivator with the loss of but little time upon the part of the operator. The device is also extremely strong and durable in its construction, and owing to its extreme simplicity, it will be obvious that the invention can be produced at small manufacturing cost.

While I have shown and described the construction and arrangement of the several parts, it will be understood that the invention is susceptible of considerable modification therein and I therefore reserve the privilege of resorting to all such legitimate changes as may be fairly embodied within the spirit and scope of the invention, as claimed.

Having thus described the invention, what is claimed is:

The combination with a cultivator, of a cotton chopper attachment therefor including a rectangular frame, obliquely disposed bars mounted in said frame, a chopping disk arranged between said bars and having its axis journaled therein and disposed at a right angle to the plane of said bars, attaching bars pivotally connected to the forward end of said frame, means for detachably clamping said bars upon the cultivator frame, foot bars mounted upon the rear end of the chopper frame, and a plurality of chains connected to the rear end of said frame and adapted to be adjusted upon the cultivator frame to raise or lower the rear end of the chopper frame and dispose the chopping disk at a desired height above the ground.

In testimony whereof I hereunto affix my signature in the presence of two witnesses.

EUGENIA C. ARTHUR,
*Executrix of the estate of George P. Arthur, deceased.*

Witnesses:
J. M. CALDWELL,
B. GROUND.

Copies of this patent may be obtained for five cents each, by addressing the "Commissioner of Patents, Washington, D. C."